(12) United States Patent
Peczalski et al.

(10) Patent No.: US 9,041,594 B2
(45) Date of Patent: May 26, 2015

(54) RF BASED TRACKER FOR ROTATING OBJECTS

(75) Inventors: Andy Peczalski, Eden Prarie, MN (US); David Daniel Lilly, Ramona, CA (US); Dinkar Mylaraswamy, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 585 days.

(21) Appl. No.: 13/114,767

(22) Filed: May 24, 2011

(65) Prior Publication Data

US 2011/0285578 A1    Nov. 24, 2011

Related U.S. Application Data

(60) Provisional application No. 61/347,750, filed on May 24, 2010.

(51) Int. Cl.
*G01S 13/08* (2006.01)
*G01S 13/58* (2006.01)
*G01S 13/42* (2006.01)
*G01S 13/66* (2006.01)
*G01S 13/88* (2006.01)

(52) U.S. Cl.
CPC ............... *G01S 13/58* (2013.01); *G01S 13/42* (2013.01); *G01S 13/66* (2013.01); *G01S 13/88* (2013.01)

(58) Field of Classification Search
USPC ............................................... 342/104
See application file for complete search history.

(56) References Cited

U.S. PATENT DOCUMENTS

| | | | | |
|---|---|---|---|---|
| 4,160,248 | A | * | 7/1979 | Hubka et al. ................ 342/115 |
| 4,413,519 | A | * | 11/1983 | Bannister et al. ............. 73/660 |
| 4,961,039 | A | * | 10/1990 | Yamauchi et al. ........... 340/554 |
| 5,422,477 | A | * | 6/1995 | de La Chapelle et al. ................. 250/227.12 |
| 6,023,235 | A | * | 2/2000 | Sauer .......................... 342/25 F |
| 7,095,221 | B2 | * | 8/2006 | Bosselmann et al. ........ 324/71.1 |
| 7,341,428 | B2 | | 3/2008 | Twerdochlib |
| 7,889,119 | B2 | * | 2/2011 | Evers et al. ................... 342/118 |
| 2005/0156786 | A1 | * | 7/2005 | Blaschke et al. ....... 343/700 MS |
| 2005/0162049 | A1 | * | 7/2005 | Krill ............................ 310/800 |
| 2007/0132461 | A1 | * | 6/2007 | Holmquist et al. ........... 324/644 |

* cited by examiner

*Primary Examiner* — Frank J McGue

(74) *Attorney, Agent, or Firm* — Schwegman Lundberg & Woessner, P.A.

(57) ABSTRACT

An RF beam is used to probe the presence or absence of a rotating blade in a known field of view. Timing of appearance or disappearance or "zero-crossing" of a reflected signal is correlated with timing of the blade movement. Blades which are leading or lagging versus other blades will produce different timing signatures representative of alignment of the blades.

18 Claims, 5 Drawing Sheets

RF BASED TRACKER FOR ROTATING OBJECTS

RELATED APPLICATION

This application claims priority to U.S. Provisional Application Ser. No. 61/347,750 (entitled RADAR BASED TRACKER, filed May 24, 2010) which is incorporated herein by reference.

BACKGROUND

Rotating blades in a blade assembly may experience bending, twisting, and aerodynamic forces that can lead to a blade moving out-of-plane with respect to the other blades, or experience a lead/lag effect where uniform phase between the respective blades is not maintained. In the case of turbine blades installed on a disk, that blade lead or lag can lead to the blade assembly misbalance and damage. In the case of helicopter main rotor blades, excessive out of track or lead/lag can indicate or facilitate premature wear of the blade retention assemblies & components. Ideally, a blade's track and/or lead/lag needs to be detected with accuracy of 1-2 mm in the case of rotating helicopter blades.

SUMMARY

An RF beam is used to probe the presence or absence of a rotating blade in a known field of view. Timing of appearance or disappearance of a reflected signal is correlated with timing of the leading and trailing edge of the blade respectively. Blades which are leading or lagging versus other blades will produce a different timing signature representative of alignment of the blades.

In further embodiments, the reflected signal will also be modulated with the motion of the blades along the signal propagation path. The modulated reflected signal provides additional information about the blade vibration that is caused by the hub vibration or warping caused by overloading the aircraft.

DETAILED DESCRIPTION

Figure 1:
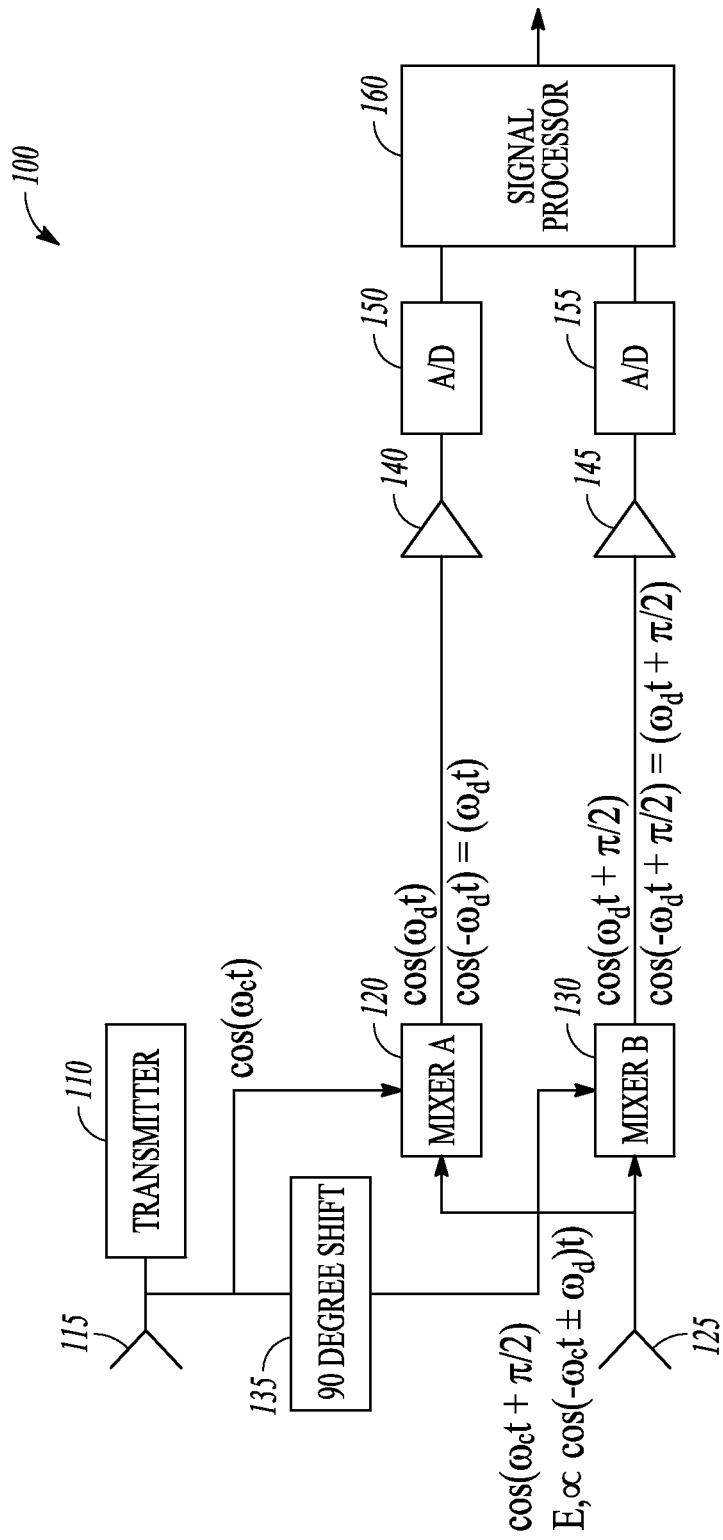
FIG. 1 is a block circuit diagram of a radio frequency based tracker with processing circuitry according to an example embodiment.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In one embodiment, a radar or RF beam e.g. 24 GHz carrier frequency is used to probe the velocity of rotating helicopter blades moving in a field of view determined by the RF beam width that can be small e.g. approximately 8 degrees or larger e.g. 30×60 degrees. The term approximately is meant to include small deviations, such as deviations less than 10%. In some embodiments the field of view may be optimized based on the particular blades being monitored. Only the velocity component that is perpendicular to the RF antenna is detected in one embodiment, using the Doppler effect.

The beam may be aimed substantially transverse to a rotation plane that the blades are rotating in. Timing of the reflected signal crossing zero (no signal present condition) corresponds to the blade being situated directly opposite to an antenna centerline, and not moving out of the rotation plane. In this case the blade velocity projected perpendicularly to the radar antenna is zero.

A blade that is twisted in the rotation plane will "cross zero" with time lag or lead versus the ideal position of a blade. Further applications may include propellers of other aircraft, wind turbine blades and others applications having rotating blades. In some instances, an error mode may occur with the blades moving out of the rotation plane at the desired zero crossing due to updrafts, downdrafts, acceleration or other events that might cause a blade to move out of plane. While this may introduce some errors for a given rotation of the blade, it may be ignored over time in some embodiments.

Similarly, appearance or disappearance of the reflected signal may be correlated with timing of the leading and trailing edge of the blade respectively entering the beam of the radar. Thus any blade which is leading or lagging versus other blades will produce a different timing signature. Accuracy of the lead or lag time measurement is related to the sampling rate and accuracy of a clock in a signal processing unit. For example at a sampling rate 256 ksps and blade rotation frequency of 30 Hz a precision of 0.04 degree may be obtained. For helicopters, the blade rotation frequency may be more in the range of 3-6 Hz, which may result in even better precision at the same sample rate.

It is assumed that the rise and fall time of the sensor does not change with misbalance because the rotation speed stays the same. A previous tracker sensor based on an optical LADAR (laser detection and ranging) or camera principle is big, expensive, and draws a lot of power. The laser reflection or optical contrast can decrease if the blade is covered with dirt, the helicopter flies in a sandstorm, or the color of the sky resembles the color of the blades. In such situations the edges of the blade cannot be detected making the sensor unreliable. Various embodiments of a radar based tracker described herein would work well in those conditions.

The zero crossing principle of the radar makes it less sensitive to the out-of-rotation-plane twist of the blade than the present optical rotor trackers which detect the motion of the blade edge. Therefore the blade edge twisting up or down could "fool" the optical tracker that the blade is lagging behind other blades. The radar based tracker can improve performance parameters because of the use of a small antenna at a high carrier frequency e.g. 24 GHz, simple electronics, and high volume, low cost building components. A conformal antenna may be mounted on the outside of a helicopter cabin without affecting aerodynamics versus non-conformal optical LADAR or camera optics.

A circuit diagram of an RF based tracker 100 in accordance with an example embodiment. The tracker 100 includes a sensor having a transmitter 110 with an antenna 115 for directing an RF output signal generated by the transmitter 110 in a desired direction. The transmitter output signal is provided to a first mixer 120. An antenna 125 receives signals reflected from the rotating blades and provides a corresponding signal to first mixer 120 and to a second mixer 130.

In one embodiment, the output from transmitter 110 cos ($\omega_c t$) is also provided to a 90 degree shifter 135, which provides a 90 degree shifted transmitter output signal cos($\omega_c t + \pi/2$) to the second mixer 130. In one embodiment, first mixer 120 provides an output signal $$\cos(\omega_d t)$$

$$\cos(-\omega_d t) = \cos(\omega_d t)$$

to an amplifier 140. Second mixer 130 provides an output signal cos($\omega_d t - \pi/2$) that is a result of mixing of a phase shifted transmitter output signal, cos($\omega_c t + \pi/2$) and the signal received from antenna 125, cos(($\omega_c - \omega_d$)t) to an amplifier 145, where $\omega_d$ represents a Doppler shift from the movement of a blade.

In addition to the signals providing information regarding the blade crossing the beam, a separate beam may be directed toward a gearbox driving the blades to detect vibrations. The gearbox may be monitored during all phases of flight by an RF based tracker using a Doppler effect in order to monitor the integrity of the attaching structure e.g. elastomer. A gearbox rotation tracker may be used to measure the motion of the gearbox body in the direction perpendicular to the antenna and therefore sense an increase in the gearbox displacement which is indicative of attachment deterioration. Trending of the displacement is related to the flight phases in one embodiment for one-to-one comparison. The gearbox rotation tracker may be incorporated with the blade rotation sensor or may be separate from the blade rotation sensor in various embodiments. The radar return signal may also be modulated with the motion of the blades along the signal propagation path. Therefore additional information about the blade vibration that is caused by the hub vibration or warping caused by overloading the aircraft may be measured using the same return signal.

In one embodiment, the tracker 100 may include two sensors, one that senses vibrations of a gear box of the blade assembly using the Doppler shift, and the other to sense displacement of the blades from each other by measuring the time elapsed between crossings of each blade to give a measure of the blade angular misalignment.

In various embodiments, the antenna 115 transmits RF energy toward the target. The RF energy reflects from metal surfaces and edges and returns to the sensor, being received at antenna 125. The reflection phase changes proportionally to the displacement of the reflective surface relative to the radar divided by the RF frequency signal wavelength. In one embodiment, an RF frequency at 24 GHz may be used since it is an unregulated frequency band committed to the automotive radar sensor. The wavelength of the signal is short (e.g., 1.25 cm) for high sensitivity of the sensor.

The reflected signal may be modulated by the target vibration magnitude, and any movement that is common to the target and the antenna is rejected. Upon return to the sensor, the return signals are mixed (beat against each other) with transmitted signals. The output signal phase of the sensor follows the radial displacement (in a direction perpendicular to the antenna) of the target in the time domain. In some embodiments, the output signal is converted in the frequency domain by fast Fourier transform (FFT). These signals provide both vibration information when directed at the gear box, and blade crossing timing information when directed orthogonal to the rotating blades.

The outputs from amplifiers 140 and 145 may be converted to digital signals by analog to digital converters 150 and 155 respectively, whose digital outputs are provided a signal processor indicated at 160. The signal processor 160 may include one or more processors and use the digital signals to determine the times at which each blade front and back cross the beam transmitted by antenna 115.

Figure 2:
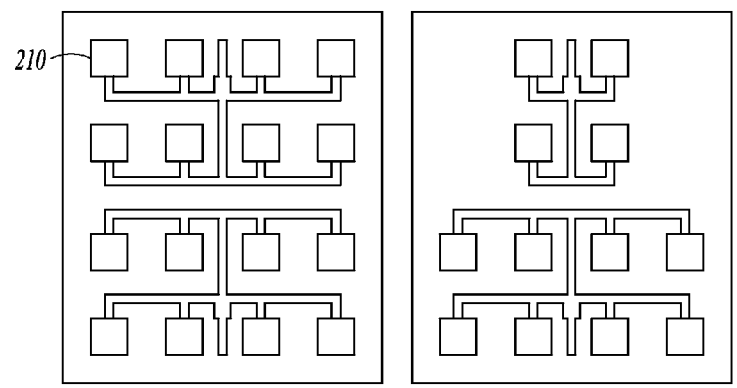
FIG. 2 is a block diagram of antennas for a radio frequency based tracker according to an example embodiment.

Two sensors with different antenna fields of view are shown in FIG. 2. Each sensor has a separate transmit and receive antenna. An antenna that consists of a 2×4 array of half-wavelength patches 210 has a field of view of 30×60 degrees. A low-cost narrow field of view horn antennas with no side lobes could also be used. In various embodiments, antennas may be tuned to a desired field of view as a function of an application. Such antennas may be formed on circuit boards in some embodiments, or other structure that provides adequate support, and small aerodynamic profile in helicopter applications. The antennas may conform to the shape of the cabin on which it is placed in one embodiment. Forming the antennas on a flexible circuit board provides an antenna that may be conformed to many different surfaces.

Figure 3:
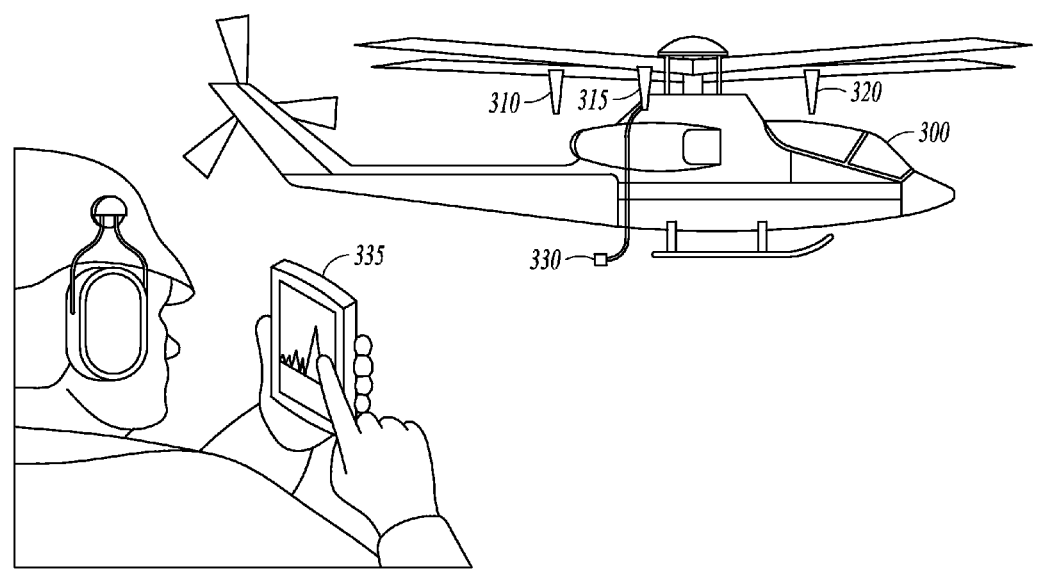
FIG. 3 is a perspective diagram of a helicopter having a radio frequency based tracker according to an example embodiment.

Various installations of the tracker on a helicopter 300 are shown in FIG. 3. There are several possible sensor transmitter antenna 115 locations having beams directed toward rotating helicopter blades 325 shown at 310, 315 and 320. Location 310 is behind a cabin toward the tail of the helicopter. Location 315 corresponds to a side of the cabin, and location 320 is located in front of the blades on top of the cabin. Further locations may also be used if convenient. The antennas do not need to be placed directly under the blades, but may be located outside the blade footprint in various embodiments, while making sure the blades can cross a center line of the antenna.

An RF transmitter 330 may be positioned to receive signals from the tracker and relay them to a handheld display 335 for viewing information from the tracker.

Figure 4:
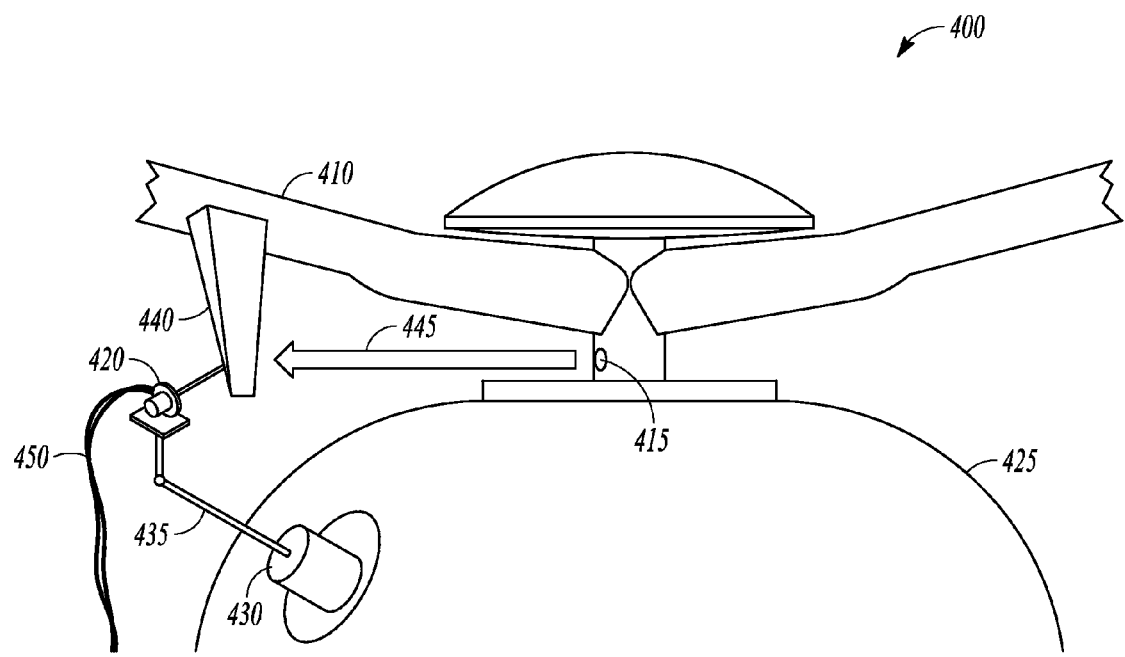
FIG. 4 is a partial perspective diagram of a helicopter illustrating a placement of a radio based tracker including a Doppler based function according to an example embodiment.

FIG. 4 shows a partial view of a top of a helicopter 400 with blades 410 coupled to a gearbox 415. A tracker 420 is shown temporarily mounted to a side of a cabin 425 by suction cup 430 and extending rod 435 to position the tracker 420 under the rotating blades 410 and at an elevation sufficient to provide a view of the gearbox 415. Tracker 420 projects a first RF beam 440 toward the blades 410, and a second RF beam 445 toward the gearbox 415. The second RF beam 445 may utilize separate transmit and receive antennas, as well as additional circuitry to convert and process the signals received.

In one embodiment, signals from the tracker 420 are provided via a cable 450 to a transmitter, not shown. The transmitter can be used to process the signals and transmit the processed signals to other devices for viewing and recording, or simply passing the tracker signals to other processing equipment for further processing in various embodiments. In further embodiments, one or more trackers 420 may be mounted directly on the helicopter in desired locations, and may also include wireless communication capabilities to process and/or transmit sensed data. The radar can also be placed inside the helicopter and monitor the blades through the windows e.g. windshield since the radar signals can penetrate nonconductive materials.

Figure 5:
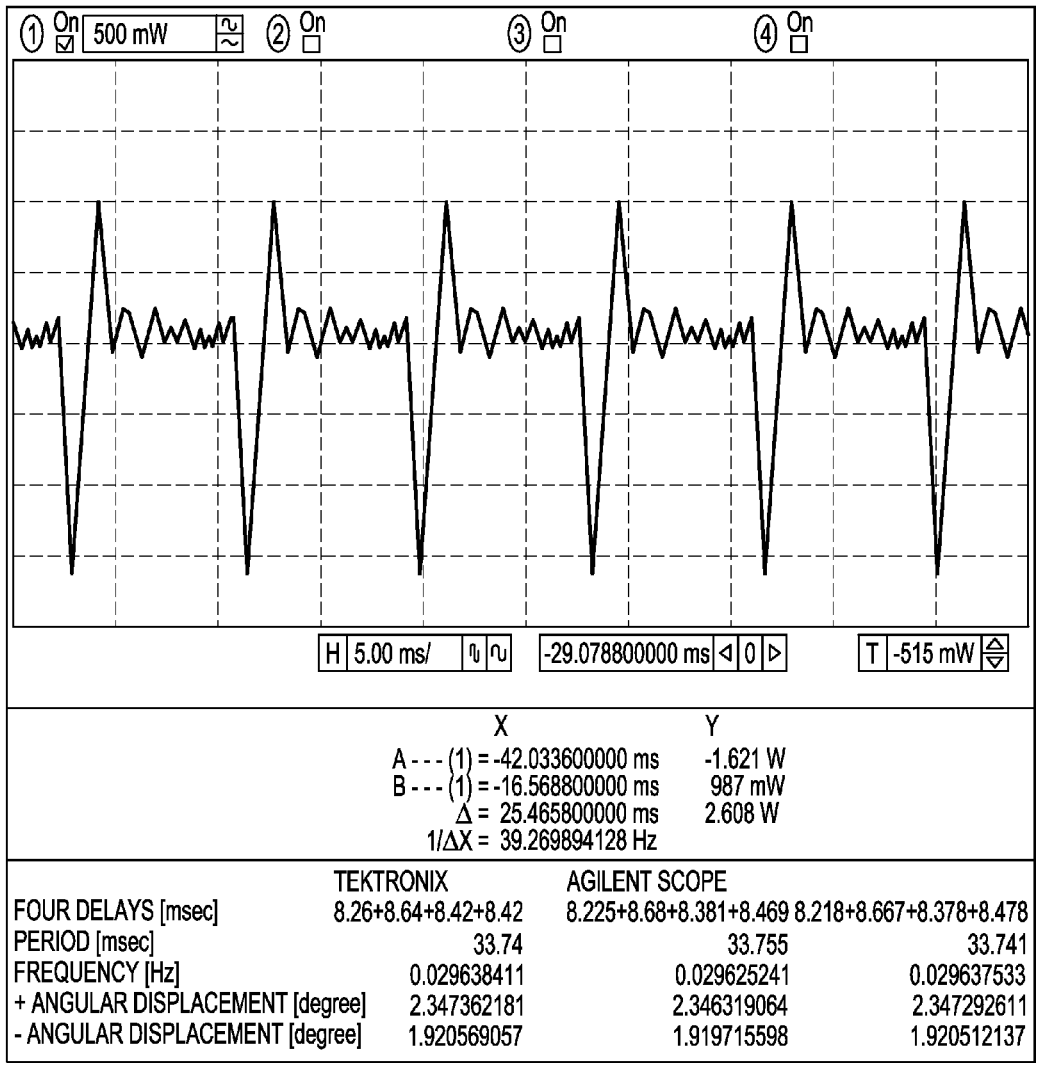
FIG. 5 is an example scope output of signals from a radio frequency based tracker according to an example embodiment.

Example waveforms in FIG. 5 show that the crossing of the blade in front of the tracker antenna gives a sharp transition of the radar output from the high to low value. The zero crossing of that transition can be used as the measure of the blade misalignment. Zero crossing of each waveform corresponds to the blade facing the radar antenna. Measuring the time elapsed between crossing of each blade gives a measure of the blade angular misalignment. The data at the bottom of FIG. 4 shows that a blade that was intentionally misaligned by ~2.5 degrees shows the misalignment in the time domain e.g. +2.3 degree on one side and −1.9 degree on the second side of the blade. Due to the blade mechanical construction there is a misalignment uncertainty of ~0.5 degree.

The functions or algorithms performed by the radar based tracker may be implemented in software or a combination of software, hardware, and discrete components, such as transmitters, shifters, and mixers in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 6:
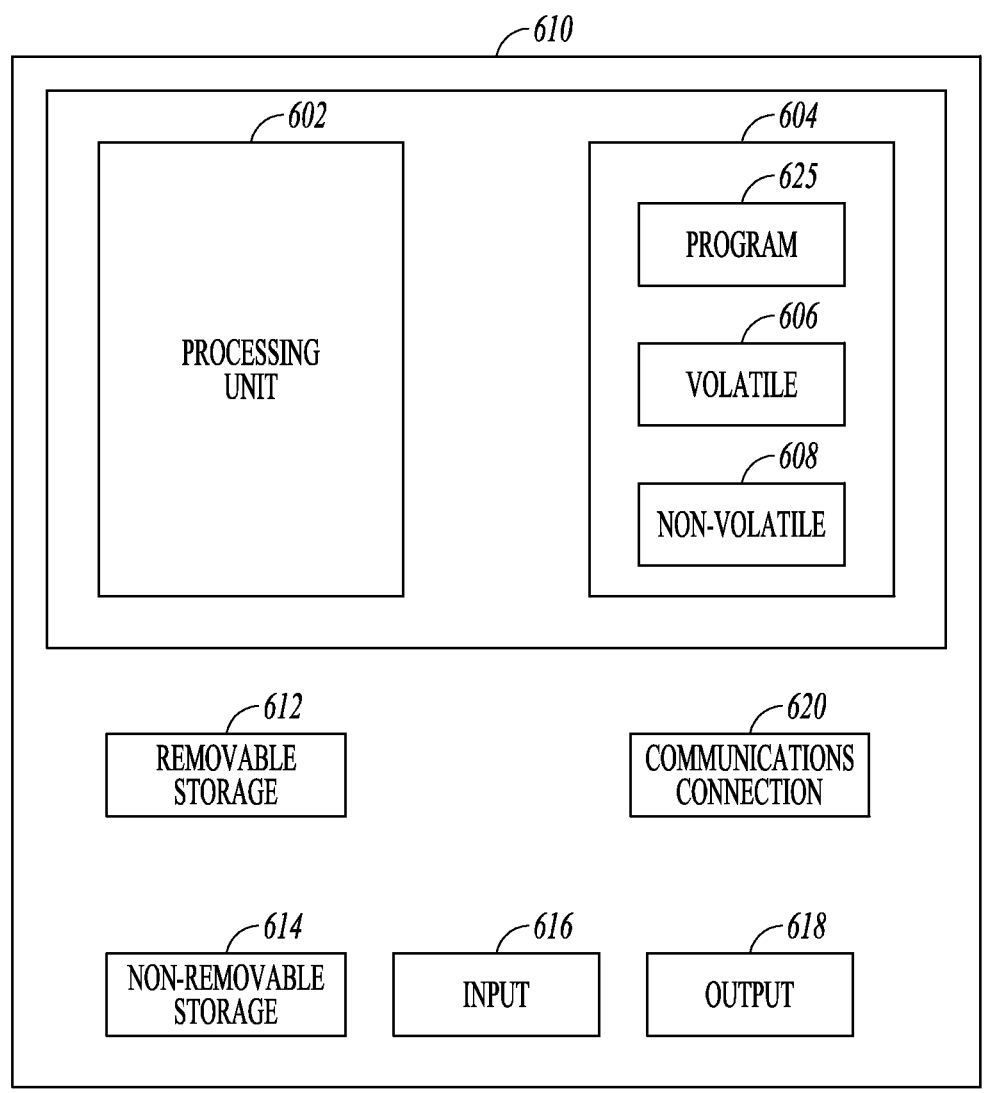
FIG. 6 is a block diagram of an example computer system for processing signals and performing methods according to an example embodiment.

A block diagram of a computer system that executes programming for performing the above algorithm is shown in FIG. 6. A general computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions to execute methods and algorithms described above may be stored on a computer-readable medium such as illustrated at a program storage device 625 are executable by the processing unit 602 of the computer 610. A hard drive, CD-ROM, and RAM are some examples of articles including a computer-readable medium. In one embodiment, a user interface is provided, such as a touch screen device for providing both input 616 and output 618.

The invention claimed is:

1. A method comprising:
   directing a plurality of RF beams toward a group of rotating blades of a helicopter blade assembly, the plurality of RF beams directed transverse to a rotation plane of the group of rotating blades so as to be directed generally orthogonal to a chord of the rotating blades;
   placing a plurality of RF based sensor antennas in respective positions to detect a reflected RF beam from the group of rotating blades, each sensor antenna of the plurality of sensor antennas placed to receive a reflected beam from a respective RF beam of the plurality of RF beams;
   detecting the presence, absence, or position of the group of rotating blades with respect to the plurality of sensor antennas;
   tracking timing of the presence, absence, and crossing of each of blade of the group of rotating blades over a center line of each of the plurality of sensor antennas based on the detected presence, absence, or position of the group of rotating blades; and
   transmitting information related to the presence and absence of the blades.

2. The method of claim 1 and further comprising calculating timing for position of the blade crossing over the antenna to determine timing of a leading and trailing edge of the chord of each blade.

3. The method of claim 1 wherein the band of the RF beam is approximately 8 degrees or larger.

4. The method of claim 1 wherein placing the radar sensor antennas includes placing the sensor antennas on a cabin of a helicopter.

5. The method of claim 4 wherein the radar sensor antennas include an antenna that conforms to the shape of the cabin on which it is placed.

6. A method comprising:
   directing a plurality of RF beams toward a group of rotating blades of a helicopter blade assembly, the plurality of RF beams directed transverse to a rotation plane of the group of rotating blades so as to be directed substantially orthogonal to a chord of the rotating blades;
   placing a plurality of RF based sensor antennas in respective positions to detect a reflected RF beam from the group of rotating blades, each sensor antenna of the plurality of sensor antennas placed to receive a reflected beam from a respective RF beam of the plurality of RF beams and to detect the presence, absence, or position of the group of the rotating blades with respect to the plurality of sensor antennas;
   tracking timing of the presence, absence, and crossing of the blades over a center line of the antenna of the group of rotating blades based on the detected presence, absence, or position of the group of rotating blades;
   transmitting information related to the presence and absence of the blades; and
   tracking vibrations of a gearbox driving the blades using a further RF based sensor antenna positioned on the helicopter to detect a reflected beam from an RF beam directed toward the gearbox.

7. The method of claim 6 wherein the vibrations of the gear box are tracked using a phase shift or Doppler velocity in an RF beam directed toward the gear box from the further RF based sensor.

8. The method of claim 1 and further comprising monitoring substantially out of rotation plane movement of the blades.

9. A system comprising:
a plurality of RF transmitters;
a plurality of antennas, each antenna coupled to a respective RF transmitter of the plurality of RF transmitters, each of the plurality of antennas to transmit an RF beam directed toward a rotating group of blades of a blade assembly and orthogonal to a chord of the blades, each of the antennas to receive a respective reflected signal from the blades; and
circuitry coupled to the antennas to analyze the reflected signals, detect the presence and absence of the blades and transmit signals corresponding to the presence and absence and crossing of the blades over an antenna center line representative of blade alignment.

10. The system of claim 9 wherein the band of the RF beam is approximately between 8 and 60 degrees.

11. The system of claim 9 wherein the antenna is formed in a conformal manner.

12. The system of claim 9 wherein the antenna includes separate transmit and receive antennas.

13. The system of claim 12 wherein the antenna includes further transmit and receive antennas to direct an RF beam toward a gearbox of the blades and receive a reflected RF beam from the gearbox, respectively, wherein the circuitry is to analyze the reflected beam to monitor vibrations of the gearbox.

14. The system of claim 12 wherein the circuitry includes a pair of mixers to receive signals from the receive antenna and a signal from the RF transmitter, one shifted by 90 degrees with respect to the other.

15. The system of claim 13 wherein the circuitry further calculates a phase or Doppler frequency shift between the transmitted and received signals from the gearbox to determine vibration of the gearbox.

16. A method comprising:
transmitting an RF beam from an RF antenna, the RF beam directed substantially orthogonal to a plane in which blades are rotating and substantially orthogonal to a chord of the blades;
receiving reflected signals from the blades;
tracking timing of the presence, absence, and crossing of the blades over the center of the RF antenna of the group of blades as a function of the received signals; and
transmitting information related to the presence and absence of the blades.

17. The method of claim 16 wherein the band of the RF beam is approximately between 8 and 60 degrees.

18. The method of claim 16 and further comprising tracking vibrations of a gearbox driving the blades using a phase shift in an RF beam directed toward the gear box.

* * * * *